United States Patent [19]
Strickland et al.

[11] Patent Number: 6,080,202
[45] Date of Patent: Jun. 27, 2000

[54] UNIVERSAL COMPATIBILITY SOFTWARE SYSTEM FOR SERVICES IN COMMUNICATION AND INFORMATION PROCESSING NETWORKS

[75] Inventors: David Peter Strickland; Gordon Matthew Deans, both of Ottawa, Canada

[73] Assignee: Nortel Networks Corporation, Montreal, Canada

[21] Appl. No.: 08/891,459

[22] Filed: Jul. 10, 1997

[51] Int. Cl.[7] .................................................. G06F 9/44
[52] U.S. Cl. ................. 703/27; 709/201; 395/200.42; 370/259; 379/201
[58] Field of Search .................. 395/500, 200.34, 395/200.48, 200.5, 200.55, 651, 674, 681, 683, 200.42, 200.58; 370/396, 453, 438, 259; 709/201; 707/103; 379/201

[56] References Cited

U.S. PATENT DOCUMENTS

| | | | |
|---|---|---|---|
| 5,021,949 | 6/1991 | Morten et al. | 364/200 |
| 5,404,396 | 4/1995 | Brennan | 379/201 |
| 5,740,176 | 4/1998 | Gupta et al. | 370/440 |
| 5,758,072 | 5/1998 | Filepp et al. | 395/200.5 |
| 5,758,079 | 5/1998 | Ludwig et al. | 395/200.34 |
| 5,796,967 | 8/1998 | Filepp et al. | 395/339 |
| 5,812,533 | 9/1998 | Cox et al. | 370/259 |
| 5,862,325 | 1/1999 | Reed et al. | 395/200.31 |

FOREIGN PATENT DOCUMENTS

| | | |
|---|---|---|
| 0275448 | 7/1988 | European Pat. Off. . |
| 0282149 | 9/1988 | European Pat. Off. . |
| 0498130 | 8/1992 | European Pat. Off. . |
| WO 96/04754 | 2/1996 | WIPO . |

OTHER PUBLICATIONS

Greiman, W.H. et al "Experience in using a software bus to build reusable scientific software" 8th Conference on Computing etc. 9–13 Apr., 1990.

*Primary Examiner*—Kevin J. Teska
*Assistant Examiner*—Thai Phan
*Attorney, Agent, or Firm*—Thomas R. Vigil

[57] ABSTRACT

A method to control feature interaction and ensure compatibility among disparate service features, resources and terminals of a communications network is provided. Resource devices and terminals access a compatibility message bus via interface agent modules when originating requests or events. The message bus, which could be, for example, an Ethernet link of any length, is accessible to all devices and to one or more compatibility controllers in the computing platform of a PBX or switching office, or in a general computing platform separate from the switch or PBX. A temporary compatibility control module is then constituted, which processes requests and events, by retrieving processing rules stored in a data base to ensure provision of invoked service features in a controlled manner.

5 Claims, 4 Drawing Sheets

UNIVERSAL COMPATIBILITY SOFTWARE SYSTEM FOR SERVICES IN COMMUNICATION AND INFORMATION PROCESSING NETWORKS

BACKGROUND OF THE INVENTION

1. Field of the Invention

The present invention relates generally to the provision of services in communications networks and, in particular, to software systems to ensure compatibility between network subsystems providing end-user services and the like. More particularly still, the present invention provides a universal system architecture and method independent of the nature of any particular subsystem, service or device. In a more particular preferred application, the compatibility system comprises a family of software packages that allow real-time interworking among standalone network services, providing linkage between functionalities such as voice mail, directory assistance, interactive voice response and internet services. While this application is for telecommunication services, the universal system may interwork standalone information processing services. It has unique value where stable real-time performance is required and interaction among the services needs explicit context-sensitive arbitration.

2. Related Art

In the present system environment, for example in telephony, a standalone service is a service which has been designed to provide certain, well-defined functionality. These standalone services are invoked and used; and may be called upon to implement a service. The stand alone devices, however, have no way of communicating with other standalone devices. Thus, devices and services are not integrated, and on the whole do not communicate (i.e. share data or resources) with each other. Where integration does occur it is ad hoc, with programmers designing specific solutions for specific problems, and normally provided by equipment manufacturers who sell a proprietary, one-vendor cluster of systems.

In U.S. Pat. No. 5,404,396 issued Apr. 4, 1995 to Brennan entitled FEATURE INTERACTION MANAGER addresses the particular problem known in telephone systems as "feature interaction", where, as the number of available features offered within a telecommunication switching network increases, the possible (uncontrolled) interaction between the features becomes highly significant and a source of both potential confusion to the subscriber, as well as faults within the network. For this reason, feature managers are provided within the switching system which manage the functionality of each feature in such a way that the different aspects of the functionality are coordinated. A feature manager monitors each event which occurs and directs that event to the feature logic of the software block implementing a feature which requires that event for invocation and/or control. However, when more than one feature requires the same event, the situation becomes more complex and requires that access to certain features be suspended and/or prioritized when other features are in use by a subscriber. The solution is to interpose a feature interaction manager (FIM) between a telecommunications switching platform within a network and the feature logic providing call features to subscribers using the platform. Control is interposed within the interface between the detection of events within the switching system and the implementation of the telecommunications services by the feature logic in order to manage the interaction of various ones of a plurality of features provided to a subscriber. The system evaluates events within the network in order to isolate each feature from the other features and associates them only through the feature interaction manager.

In the field of information processing, International Application No. PCT/US95/15432 published Jun. 6, 1996 as No. WO 96/17296 and entitled METHOD AND APPARATUS FOR IMPLEMENTING A MESSAGE DRIVEN PROCESSOR IN A CLIENT-SERVER ENVIRONMENT is abstracted as follows:

A message driven processor operates as middleware between clients and back-end hosts or servers in a large client-server system to reduce the number of concurrent sessions required to be supported by the network and to allow a common client user interface to divergent back-end systems. High level requests from a client in support of a business function are translated into workflows which may involve multiple requests to back-end servers by the message driven processor. Information resulting from workflows and information retrieved from back-end servers may be integrated into a single reply message to the requesting client.

SUMMARY OF THE INVENTION

The problem in telephony is that violation of assumptions is a major source of unpredictable feature of interactions. These interactions typically arise when new features and network capabilities, which unknowingly violate pre-existing technology assumptions, are introduced. The usual response is to complicate definitions and implementation for existing (so called "legacy") services to cope with each new change in the environment. As a result, the system becomes less testable and less resilient to future changes.

As an example, consider the call-waiting service. The basic idea of call-waiting is to alert the user that a new call has arrived and to provide a mechanism for the user to respond to the call. Ideally, the service logic should be that simple. In practice, the service logic embeds large numbers of assumptions about limitations on when an alert may be delivered (only when a call is 'stable', meaning call-processing is no longer in progress), what kind of alert should be delivered (particular 'beep'), how many calls may be in the 'waiting' state (one), and how to respond to a call (e.g. by hook-flash). Although these constraints are relevant in POTS (Plain Old Telephone Service) environment, they do not make sense to systems with ISDN, sophisticated terminals, or more capable bridges. The constraints also lead to problems if the user has other services which use the same signals (such as the same DTMF signals) for different purposes. Such constraints should not be part of a service definition and should not be coded into implementations. Instead, they should be dealt with by allowing a richer set of interactions (that is, a broader, more intelligent capacity to communicate) between network resources and service logic. The proposed architecture of the present invention supports these more intelligent interactions.

The concept of roles is also useful to understanding the types of interactions that can arise from the violation of assumptions. Many roles are played by various entities in the current telecommunications system. Users may fill roles of owner, subscriber, bill payer, called party, call coordinator and others. Services fill roles of busy treatment function, call termination blocker, call redirector, and many others, replacing the default behaviour of ordinary call processing. Lack of separation between the various roles that these entities play is a significant source of FI in current systems. Role confusion is manifested in the following ways:

Billing might go to the wrong party, for example, when a service hard-codes an assumption that the owner of the phone is the service user.

Calls might be delivered when undesired, blocked inappropriately, or delivered to the wrong party because the system could not properly determine the destination of the call.

Role confusion contributes to signalling ambiguities in part, because service logic often appears to assume that a single service is the only user of a particular signal or feature, such as of a specific alerting pattern into the logic for a distinctive calling service. Service logic often assumes, for example, that no other service will use the hook-flash. Services also sometimes assume that the only relevant notion of 'busy' is the event reported by the switch (i.e. that the subscriber line is busy), ignoring the possibility that a set of services could create a logical hunt group, in which case 'busy' should mean that all terminals in that group are in use.

General Attributes of the Solution

There are many good reasons to decompose the components of a large system such as a telephone network into smaller separate subsystems. A major reason is that the system becomes easier to understand and to modify. When dealing with FI another reason becomes important: The division of a telecommunications system into component entities determines the set of characteristics and premises that are available to service designers and system users. If the premises are chosen properly, they will allow designers and users to express the distinctions needed in order for services to avoid confusion, ambiguity, and the resulting uncontrolled FI.

Previous work on the sources and causes of uncontrolled FI and on analysis of telecommunications feature descriptions and broadband service requirements, has shown that specific compartmentalizations, or separations, of concerns within a telecommunications system will help to reduce or eliminate many cases of FI. Specifically, the separation of:

users from terminals;

calls from connections;

user sessions from services; and services and user sessions, from management of network/resources represent significant opportunities to reduce interactions which may arise in a telecommunications system.

In addition to the particular separations listed above, the separation of concerns in a telecommunications architecture implies distinguishing between characteristics (such as busy-alert) and physical manifestations of these characteristics (for example, particular signals). Separation also implies breaking the system down into components each of which can be assigned certain roles.

The proposed architecture separates concerns by supporting separate logic functions for:

programs enforcing user profiles and preferences, programs controlling resources such as terminals, switches, bridges, interactive voice (or video) response units; and programs carrying out the basic logic of services.

This separation of concerns is achieved through the use of software agents representing each of the types of entities—users, resources, and services—in an agent-based architecture to provide the requisite compatibility. The goal of the architecture is to greatly reduce the number of assumptions which are embodied directly in the architecture and thereby to increase the probability that new services will work properly with existing (termed "legacy") services.

In the architecture, the basic entities are:

resources (terminal equipment, network equipment, voice circuits, bridges, signalling channels, signals and data bases);

users (including callers, called parties, billing parties, service providers, equipment owners);

services (the logic function itself); and signals sent between and among users, resources and services.

Compatibility enables services such as call centres, customer databases, voice mail systems and databases to be able to share session information and cooperatively respond to session events (such as call origination or user data input). It also can streamline multi-site telecommunication services so that resources such as voice mail servers and network databases are used more effectively and coherently.

Today, there are very few cases where this level of integration is achieved. More typically, individual voice or data telecom services are provided on independently functioning systems. For example, voice mail may be provided by one vendor's product, automatic call distribution (ACD) by another, and interactive voice response (IVR) by yet a third product. Customer data or corporate directories are usually kept on databases separate from these products. For each service that an enterprise or carrier wants to provide, they must purchase one or more dedicated systems. Also, although each system may provide some degree of "programmability", they cannot work together, except in very limited ways. Finally, although a few systems now exist that provide some linkage among standalone telecom services or databases, these are usually limited to a particular vendor's products, or a specific product such as an ACD system.

To achieve this integration, compatibility treats each of the standalone systems as a collection of objects, which are then "plugged into" a software bus, much as a set of independent computers and printers can be plugged into a physical communications LAN. Once the standalone systems are plugged together, compatibility facilitates interoperation among them. The standalone platforms can be any vendors' products.

Overall, compatibility's value is not in a "killer application", but in its ability to cost-effectively integrate legacy (that is, existing) services and capabilities with each other, as well as with new network functions and products. This lets owners of standalone service platforms customize services to fit specialized market needs, as well as deal with churn in their evolving telecommunications environment.

The present method provides for compatibility between disparate services in a communications, information processing and the like networks, comprising:

(a) assigning a software agent module (SAM) to each service resource device (SRD) for interfacing said SRD to a software message bus (SMB);

(b) creating a temporary software compatibility control (CC) module for each service session initiated by network participants;

(c) partitioning said CC module into at least two submodules, one (RH) for handing requests from network participants; and one (EH) for handling events generated by said RH by causing an event to access a selected SRD via its SAM.

Network participants here means any services, resource or entity represented by a proxy or agent.

BRIEF DESCRIPTION OF THE DRAWINGS

The preferred embodiment of the present invention will now be described in conjunction with the annexed drawing figures, in which.

DETAILED DESCRIPTION OF THE PREFERRED EMBODIMENTS

Figure 1:
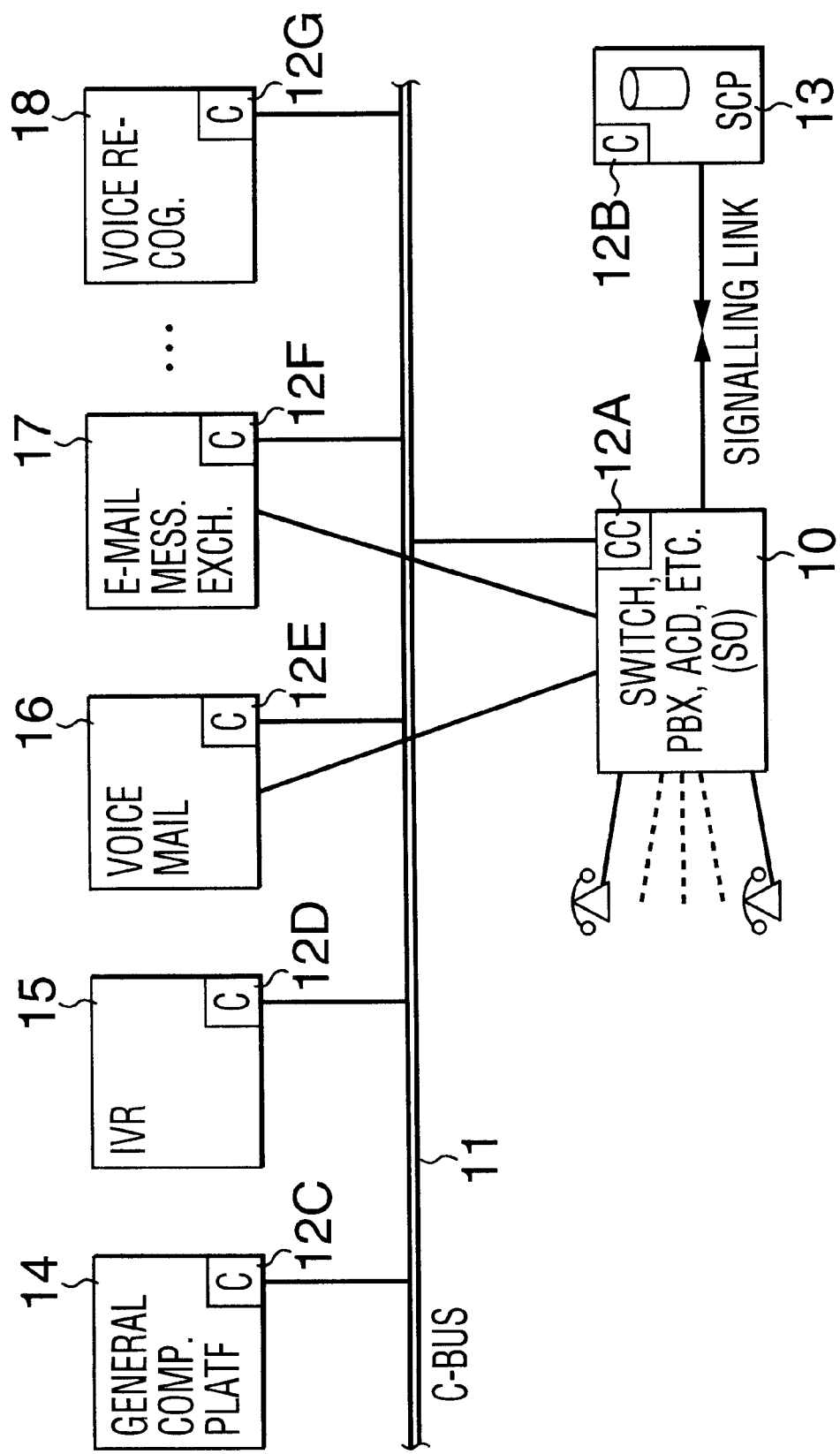
FIG. 1 is a background block diagram illustrating the preferred distribution of compatibility control within an intelligent telephone network.

Referring to FIG. 1 of the drawings, it illustrates in general terms the network environment within which the present compatibility system operates. The telephony network shown comprises means for providing connectivity such as Northern Telecom's DMS (TM) or Lucent's #5 ESS switch in a switching office, a PBX, an ACD, and the like, (SO) 10, a message compatibility bus 11 is accessed by a compatibility controller (CC) 12. The compatibility controller (CC) 12A module is resident in a computing platform in the SO 10 and exchanges messages with compatibility (C) modules 12B, 12C, 12D, 12E, 12F and 12G, which are resident in and interface, respectively, a service control point SCP 13 of the telephone system, and other resources, only some of which may exist, such as a general computing platform 14 (which may support another compatibility controller) an interactive voice response IVR system 15, a voice mail system 16, an E-Mail message exchange system 17, or a voice recognition system 18. These are only example resources and others (not shown) may be present. These resources and systems (i.e. features) may otherwise interact uncontrollably if compatibility of interaction is not present via the compatibility control modules. With respect to the SCP 13, it also may or may not be present, depending on the nature of the telephone system. Generally in an intelligent network (IN) it would be present; but this may not be the case if the SO 10 were to be simply a PBX or an ACD.

Figure 2:
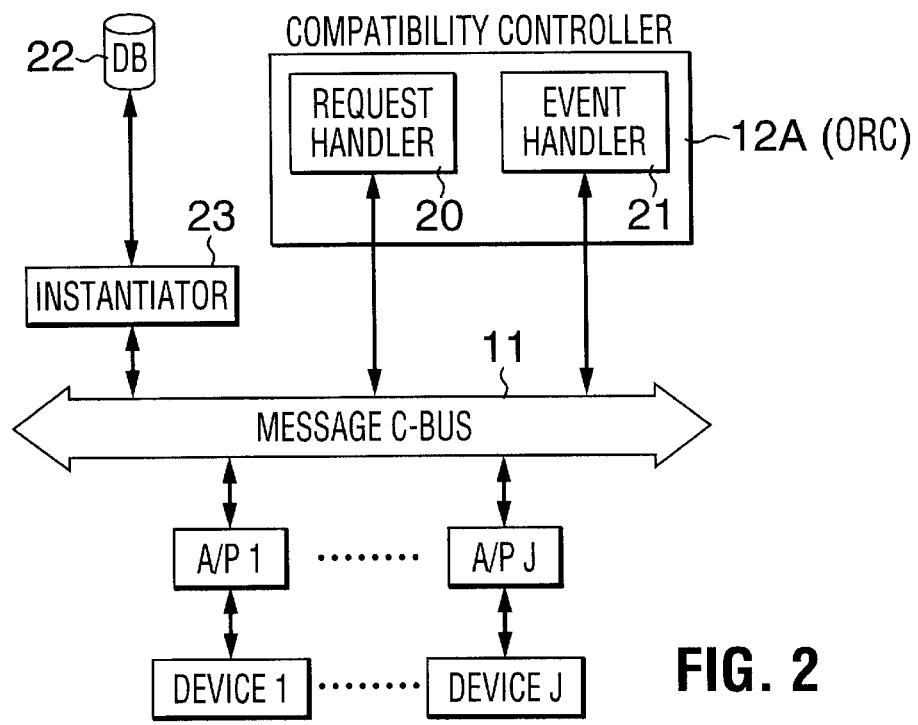
FIG. 2 is a high level block diagram showing functional blocks of the compatibility controller shown in FIG. 1.

FIG. 2 of the drawings shows in more detail the software system components for compatibility control. The essential subsystems of the CC 12A (which could also be resident in a general computing platform such as 12C) are a request handler (RH) 20 and an event handler (EH) 21. Software agents or proxies (A/P) 1 to J, which (for example) correspond to the CC submodules 12D to 12G, interface resource devices (RD) 1 to J, respectively, to the rest of the system via the C-bus 11. A database (DB) 16 is also accessible through instantiator 17 via the C-bus 11.

Figure 3:
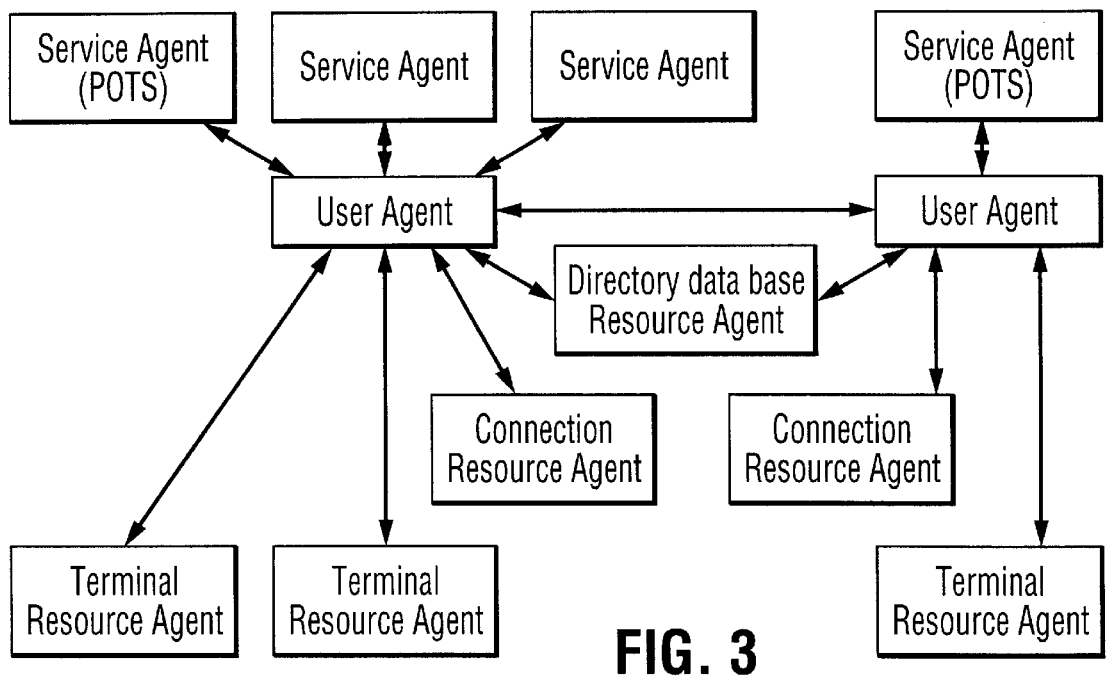
FIG. 3 illustrates the agent based architecture of the compatibility controller shown in FIG. 2.
Figure 4:
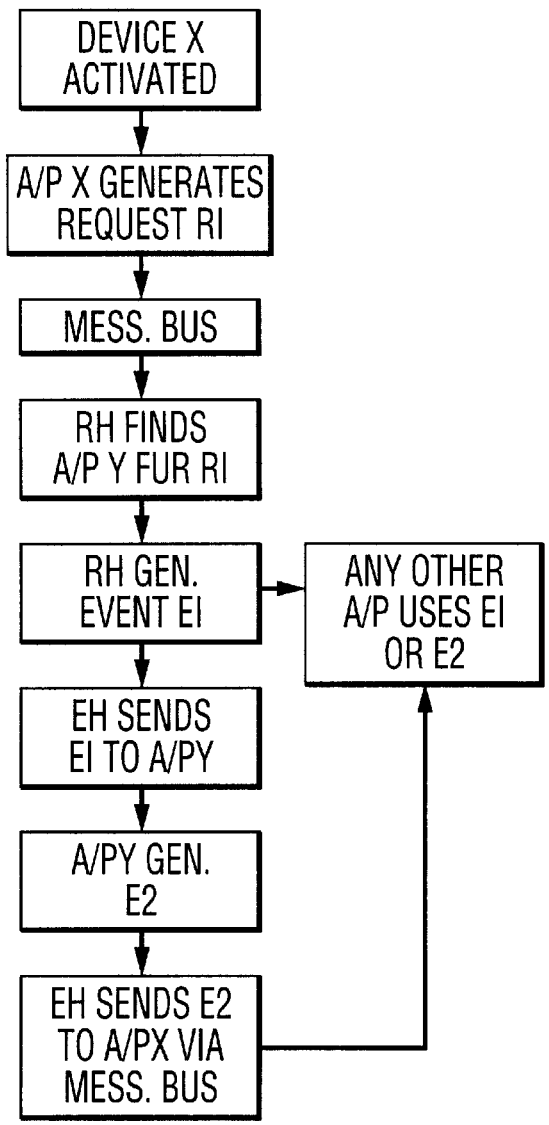
FIG. 4 is a high level flowchart showing the flow of interaction following a request for a given service resource device.
Figure 5:
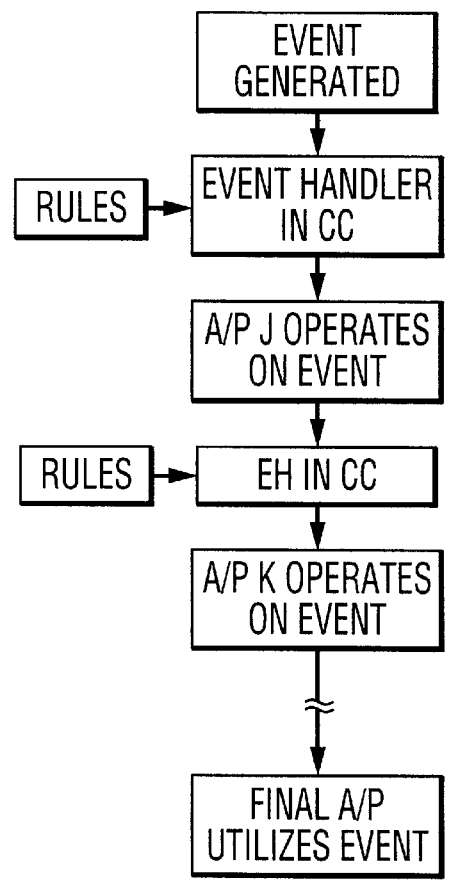
FIG. 5 is a high level flowchart showing the flow of processing once an event has been generated from the interactive in FIG. 4.

FIG. 3 illustrates the run-time environment of the compatibility system. In general terms, the run-time environment supports the execution of software for sessions. This includes access to various support functions (locators, address resolvers, etc) that are used by the sessions but are not part of the specific instances created for the session. For example, a runt-time environment would include an operating system, and ORB (object request broker), several databases and any software functions used by the sessions during an execution. Software outside of the runtime environment is often present for the purpose of altering information within databases or support functions. Thus, the compatibility system is made up of a run-time environment and an environment that supports the run-time environment. The run-time environment comprises controllers, agents and proxies. A Controller will exist for each user active a service session. The controller handles events and requests during the execution of a service session. Agents represent functionality within the system, and interact with the controller via events or request. Proxies are a special type of agent that deal with legacy devices that are unable to understand compatibility events.

Agents represent some kind of function or service within the compatibility system. They act in two major roles. When representing a service, agents request resources and services of the compatibility controller in some logical manner in order to create functional components of a service or, possibly, an entire service. The agent makes a request to the controller which will, if possible, return to the requesting agent the required resource or information. Since control is returned to the agent, the agent can implement service logic. When representing a resource an agent is able to respond to events requesting their functionality. In this mode it is possible that an agent use other agents functionality to complete the task required.

Proxies are entities (special agents) which handle any of the translation issues which arise when trying to link disparate hardware and software systems. Proxies translate information from one form to another as needed by communicating services. Proxies are both syntactic and semantic in nature. Being semantic, a proxy ensures that a statement makes sense to each of the parties involved; that the statement is meaningful. Being syntactic, on the other hand, a proxy ensures that the parameters of a particular message are in the proper order. both attributes of a proxies are needed for effective communications to take place. Proxies act as interface between the two systems which must communicate. The proxy and agent interfaces are exposed to the compatibility controller (12A or 12C). That is, the controller understands the available "system calls" it is allowed to perform. This means that the compatibility system also knows how to order its parameters.

At its most basic level, the compatibility controller is an event router and a request processor. It is the job of the compatibility controller to manage multiple agents. The controller is provided with rules by each of the services it can invoke and these rules govern the controller's behaviour. A system designer creating a service provides a service behaviour. Essentially, an agent registers an interest in certain events with the controller. When an event occurs, the controller passes the event information off to any of the agents which have registered prior interest. The controller does not need to know how services work but only where to find the requested service (and this may be done through a "resource handler") and how to discern which messages are of interest to a given service. A controller is invoked for each "user" in a call instance, hence where only one user is in a call instance (such as for voice mail retrieval), there will only be one controller present. In the case where multiple users are in a call instance, such as a conference call, where users may have other active services, these will each have their own controllers constituted.

The controller, say 12A, is instantiated via instantiator 23 at the start of a user/call instance session, by the supporting environment. At this time the controller is loaded with its profile from DB 22 for the course of the session. This profile is provided in the form of rules, which are the necessary information for the controller to be able to handle events and requests that are presented to it.

The compatibility controller comprises from sub-modules that perform specific tasks in the role of the controller. The two primary sub-components of the controller 12A (or 12C) are: the event handler (EH) 20 that provides the needed processing to handle events and the request handler (RH) 21 which handles requests made to the controller. One of the main functions of the controller is to handle interactions between features. It does this by the way it uses the event handler (with supplied rules) to manage the flow of information. It also enables the reuse of functions within the network by means of the request handler.

Within the CC 12A, the EH 21 uses rules provided to the CC 12A to decide which agents or proxies (A/P1 to A/PJ) should be informed of the events. The rules can be static (in that the rules are unchangeable once the controller has been created) or dynamic (in that it is possible to change the rules, or remove them). The dynamic rules can be added, altered or removed after a controller has been created. These new rules or changes can be requested by services represented by either agents or proxies. Upon receiving a new event the EH 21 uses the rules and the data provided with the event to determine to which agent or proxy the event should be made available. This provides a very flexible yet robust mechanism to provide a flow of control and ifnromation through the system. This is used to implement feature interaction management mechanisms to allow for multiple services (represented by agents or proxies) to interwork effectively without the need to alter existing services as new services are added.

The RH 20 handles requests made to the controller. The RH 20 uses the information provided with the request to either find a proxy or agent that is able to complete the request, or to modify dynamic rules within the controller. When a proxy or agent is found, the RH 20 can then generate an event to invoke that agent or proxy. This event is passed onto the EH 21 to ensure that any feature interaction details can be dealt with by the EH 21 prior to having the particular agent or proxy perform its function. In the case where the request is to modify dynamic rules within the controller, the RH 20 will attempt to do this. Assuming there are appropriate permissions, the rules within the controller can be changed to alter the flow of control or information. This mechanism allows for agents or proxies to request the behaviour of the controller be changed to affect the behaviour of the remainder of the call instance.

A significant advantage of having the RH 20 is that the agents or proxies (requesting certain functionality) do not require a priori knowledge of:

what functionality is available;

where the functionality resides; or how the function is implemented.

The RH 20 is able to handle requests for finding resource functionality as well as requests for invoking existing services. This enables the ability to reuse existing functionality across a network for new services, as well as enabling services to invoke other services and hence easily provide integrated services offerings to end users.

Thus the CC 12A is able to provide basic mechanisms for allowing multiple services to interwork. These mechanisms enable the combination of services across multiple network elements, in a manner which is transparent to the services themselves. The basis for these mechanisms are that they are event driven (hence the use of an EH). The behaviour of any interactions are controlled by means of rules that are provided to the CC 12A from two sources. The first being the services, with the second being a service integrator or broker which is responsible for creating a users service suite.

Some feature interworking rules are generic and are used where no other rule is present to override. These rules include passing events to the most recently activated service and subsequent services until the event is "consumed" by one of the services.

With reference now to FIG. 3, a general description of the compatibility system in terms of its agent-based architecture is given. The architecture consists of a set of agents that work together to support telephony services for end users. Each agent has particular roles in the network, and behaves accordingly. Attached to each agent is data and program logic which enables the agent to play these roles.

Three types of agents are provided in the architecture: user agents, resource agents, and service agents. The basic characteristics of each type of agent, along with their characteristics which minimize and control FI, are described below.

The explicit assignment of concerns to specific agents ensures that separation is achieved. User and terminal separation is achieved through the creation of distinct user and terminal resource agents; call and connection separation is achieved through the management of calls by user agents (i.e. through sessions) and connections by connection resource agents which represent the capabilities of distributed network resources; user session control and service separation is also explicit in the selected agents; and identification of resource agents allows for separation of resource management from services and session control. The glue connecting the various agents is provided by the processing model. This model controls how messages are passed between agents. It includes mechanisms to ensure the agents act on messages in certain sequences and in ways consistent with the intentions of services and the desires of subscribers.

One major responsibility of the user agent is to manage any calls that the user is involved in, i.e. to manage the user's communication sessions. Communications between users are initially established and coordinated by the user agents of the parties involved. To establish an outgoing call a user agent would first communicate to other user agents the desire for such a call. Once the user agents have agreed on whether a call is feasible and have agreed destination information for call completion, the originating user agent will then request that the connection resource agent coordinate the bearer capabilities required. This approach results in call/connection separation and negotiated connection setup. The independence of the negotiation phase from the connection setup simplifies the resolution of interactions which can arise from restriction (e.g. screening) features. In the agent architecture the user agent is an unintelligent message center, receiving and dispatching messages from other user agents, and resource agents. It never directly responds to such messages. Responses are created by service agents. The user agent executes the processing model to determine when various service agents should receive messages and when responses are ready to be sent to other agents. A more precise description of the process of establishing an outgoing call would state that the user agent determines that various events and queries should be passed to a service agent (perhaps the POTS service agent) which creates messages which the user agent should pass on to other user agents or resource agents.

The user's preferences and profile are expressed in the choice of services subscribed, subscriber-dependent data accessed by those services, and the user agent rules regarding dispatching of messages and events to service agents. The user agent is able to fill the roles of billing party, called party, terminal owner, etc. through the use of service agents which are designed to respond to events concerning these roles. The user agent is both a client and a server to other user agents in that it sends requests to other user agents and responds to requests and notifications from other user agents. It is purely a client with regard to service agents. In general, it is also a client with regard to resource agents, but resource agents might also send it asynchronous notifications of events as requested by a user agent.

The service agent represents the processing needed to carry out the intentions of a service. In line with the processing model, each subscribed service agent provides rules to the user agent indicating when the service agent should respond to events. A service agent responds to events by creating or modifying messages to be sent from the user agent to other user agents or resource agents. As part of the response to an event the service agent may provide new dispatch rules to the user agent. In general, a service agent embodies the processing for a related set of features. The actual grouping of features into services might affect how associated data is grouped and accessed, and thus performance, but does not affect the logical operation of the agent architecture. It is important that a service agent does not do "too much" in response to a single request from a user agent. That would be akin to taking on too many roles at once, e.g. screening, blocking, redirecting, without allowing other service agents to participate in the decision. There is a tradeoff between performance and allowing cooperative interaction among features.

Service agents do not directly communicate with other service agents. They would generally not even be aware of the existence of other service agents. However, service agents "create" events which are detected by the user agent and then dispatched to other service agents which have expressed interested in those events. In this manner there is indirect communication among service agents.

It is essential that service agents avoid hard-coded assignments of actors to roles, in particular the hard-coding of specific signals. Signals should be expressed in terms of logical names (e.g. "teenage caller alert", not "distinctive ringing pattern 2"). Service agents must be designed to respond to events indicating service activation or new terminal assignment. In response to these events the service agent must ask the user agent to query the terminal resource agent for a suitable signal. Service agents need to be prepared for the event that not enough unique signals are available. They must also provide mechanisms for informing the human user about which signals will be used.

One particular service agent is the POTS agent which is designed to manage basic calls originating or terminating at a terminal registered to a user. The details of a POTS service agent are presented in a later section. The dispatch rules for the POTS agent allow other service agents to preempt the POTS agent. By having POTS represented as a service like any other we avoid the architectural disadvantages of needing to treat 'special services' and POTS differently.

Resource agents have the role of managing functionality contained in resources. They keep track of available functionality, functionality in use, functionality reserved for a particular user or other agents, and whether user agents need to be informed when some particular functionality is accessed. Data is a resource, while data based resource agents find and manage data which might help locate other agents or resources or provide information about what protocols to use the make use of an agent. Two special cases of resource agents are the terminal resource agent which represents end-terminals, and the connection resource agent which represents network resources for manipulating connections.

A terminal resource agent understands the capabilities of a terminal (e.g. fonts, MPEG decoding, alerting methods) and the signals it uses to communicate with the network and with the user. It might store the name or address of a particular User Agent who should be notified when certain events occur, e.g. to resolve issues of sharing.

A connection resource agent represents a network provider in the establishment of bearer channels. (A user with access to multiple network providers might communicate directly with multiple connection resource agents.) This agent has algorithms for establishing connections between different physical locations. The locations are identified to the agent in requests from user agents. The request can include desired constraints such as acceptable cost, minimum bit rate, optimal bit rate, and maximum delay, as well as the two physical locations between which a bearer channel is to be established and any extra functionality required such as conference bridges. The connection resource agent may control a large set of distributed resources by means of lower level (outside the agent architecture) protocols. While the agent architecture is essentially oblivious to such signalling, messages to, for example, the network ports of a terminal might be reported up to the resource agent for that terminal, triggering other actions among the Agents.

An important function of a resource agent is the reduction of signal ambiguity. At subscription time or service set-up time, a service agent will ask the user agent to send a message to a resource agent requesting a signal satisfying particular characteristics. For example, a call-waiting service agent might ask a terminal resource agent for an alerting pattern applicable while a call is in progress. The terminal resource agent might respond with a unique signal or it might indicate that no unique signals are available. In the latter case it will be prepared to respond to queries about how appropriate signals are currently assigned. Service agents could then deal with how or if a signal could be shared and how the user should be notified.

Resource agents also keep track of which user agents are using busy resources, and may have rules for how to respond or what user agent should be consulted if a different user agent tries to control a busy or reserved resource.

Resource Agents may require billing authorizations for the use of their resources. Service Agents which require use of these resources may need to obtain authorization from other parties (represented by User Agents) if billing is not to be paid by the dispatching User Agent.

Referring now to FIGS. 2, 4, 5 and 6, the processing flow of the compatibility system will be described.

With specific reference to FIG. 2, the process of constituting a "controller" in the CC module 12A (or 12C) in response to an originated event is described:

(1) Agent/Proxy 1 originates event. This is sent via the Compatibility System, to a Controller Manager. It is sent to the Controller Manager because there is no Controller associated with this event. The event will contain event data that describes what has happened to cause the event.

(2) The Controller Manager will provide the event data to an available Controller (this can be a Controller waiting, or a Controller can be created). This causes the Controller to begin its initialization.

(3) The Controller will request a profile from a Profile Manager. This request will include the event data that the Profile Manager will use to identify an appropriate profile.

(4) Profile is passed back to Controller. The profile will contain information for configuring EH & RH. The profile will also contain Event Handling Logic (which the EH was to evaluate how to handle events). This logic can be provided by several means (a) All logic is contained in profile, this requires that logic related to when a service (via an agent) should be activated is provided to the profile.

(b) Only the inter-service logic is provided within the profile. However, in this case the profile contains a list of services. The Controller would then retrieve the remaining logic (specific to the service) from the agent representing the service.

(5) The Controller Manager now passes the event to the Controllers' EH (in a sense the Controller Manager has now initiated an appropriate Controller and passes in the first event, this Controller needs to deal with). The EH uses the Event Handling logic to determine what should happen with this event (the process now continues from step 1 of the standard event handling process.

Requests

A request R1 may be initiated by a device, for example, RD1 via its agent or proxy A/P1, which is relayed to the CC 12A via the C-bus 11. Within the CC 12A, the RH 20 determines if this is a legal request depending on the originating agent/proxy, and the user this instance of the CC represents. The RH 20 finds the appropriate agent or proxy, and provides any initiation information required. The RH may use supporting functions within the environment in which it exist to find an appropriate agent or proxy (e.g. A/P2) that is able to perform the request on behalf of the requester. The RH 20 generates an event that is passed to the EH 21 to invoke activate A/P2. This enables the feature interworking mechanisms of the CC to be fully invoked if necessary. The activation event is sent to the A/P2 to activate the particular function originally requested.

Rules

Rules are basically modules of logic that needs to be evaluated followed by an action which depends on the outcome of the logic. Rules are provided to the controller for two sources. The first is the agents/proxies that provide rules to obtain events of interest to the service or function they represent. The second source is a "service integrator" that provides additional rules to arbitrate between the rules provided by the agent/proxies. For example, a dial up service such as "personal assistant" (you dial a specific number to access the service) is interested in any call-arrival event. In this case the agent or proxy representing the personal assistant service would provide a rule as follows:

Event: Call arrival;

Logic: True (means "any"); and

Action: Send event to agent/proxy.

Events (a) A/P1 generates an event that will be passed to the CC, in which the EH 21 handles the event.

(b) The EH 21 uses the rules it was provided with by the services and service brokers to determine which agent or proxy should receive the event (a default rule of last activated service is used if no other rule overrides this).

(c) If the agent that is sent the event "consumes" the event the process would cease at this point. However, the agent or proxy might modify or not alter the event in any way. In the case the event is not altered, it is sent back to the CC.

(d) The process continues from (a), and the rules within the CC will be used to determine which agent or proxy should be offered the event next.

(e) Again the agent or proxy might modify or re-assert the same event, and the process would continue.

And so forth.

Figure 6:
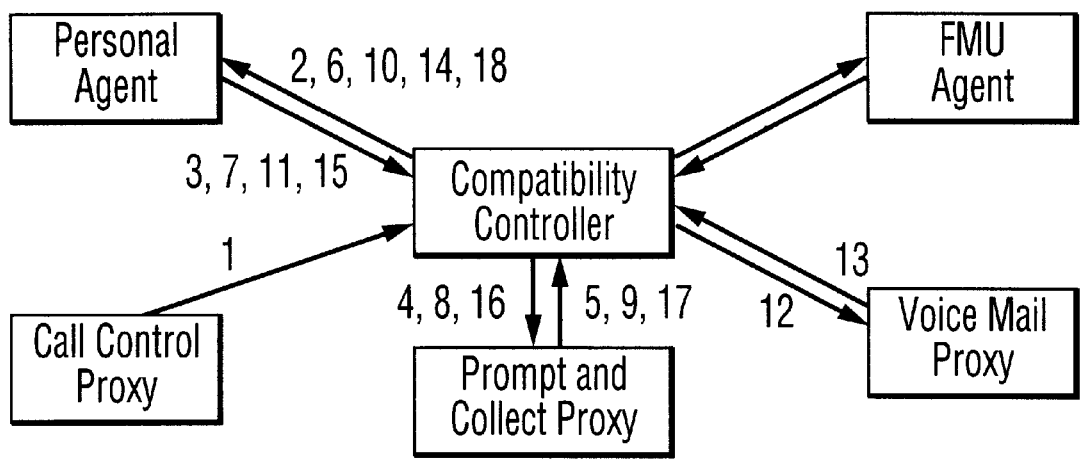
FIG. 6 illustrates the flow of interaction between the CC agent/proxies for the specific example of a personal agent meta-service.

With particular reference to FIG. 6, an example implementation of the compatibility system utilising two existing services, voice mail and follow one update, in a personal agent meta-service application.

(1) When a call arrives at the call control function the call control proxy (representing the call control function within the compatibility system) creates an event to indicate the arrival of a call.

(2) The controller rules indicate that any call arrivals should be passed onto the personal agent.

(3) To perform its function the personal agent is required to collect a PIN from the user. To do this it sends a request to prompt for, and collect a PIN from the user.

(4) The controller is able to find the "prompt and collect proxy" that is able to perform the request from the personal agent.

(5) The prompt and collect proxy invokes a prompt and collect function (this would be across an interface, since the proxy hides the details of the actual protocol used to provide the function), and returns the result to the controller.

(6) The controller returns the result to the original requester in the personal agent.

(7) To continue its service the personal agent requires a menu be played to the user to determine which service should be activated (either Voice Mail or FMU). Again it requests the controller to find a prompt and collect function.

(8) The controller again finds the prompt and collect proxy that is able to complete the request.

(9) The prompt and collect proxy interacts with the resource that provides the ability to prompt and collect, and returns the result to the controller.

(10) The controller again returns the result to the personal agent

(11) If the user requested voice mail, the personal agent will request the activation of a service (with a name of the service)

(12) The controller finds the service requested (in the voice mail proxy), and invokes the proxy.

(13) When the service is complete the controller will receive a notification to the effect that the service has released from the voice mail proxy.

(14) The service release event will be passed to the last activated services (the personal agent in this case), since the controller has no rule overriding this default behaviour.

(15) To continue its service the personal agent requires a menu be played to the user to determine which service should be activated (either voice mail or FMU). Again it requests the controller find a prompt and collect function.

(16) The controller again finds the prompt and collect proxy that is able to complete the request.

(17) The prompt and collect proxy interacts with the resource that provides the ability to prompt and collect, and returns the result to the controller.

(18) The controller again returns the result to the personal agent, and the depending on the users response the personal agent is able to request the controller activate a service (voice mail as before, or another service such as the follow me update service).

What is claimed is:

1. A method for providing compatibility between disparate services in a communications or information processing network used by a plurality of network participants, comprising the steps of:

(a) assigning a software agent module (SAM) to each service resource device (SRD) for interfacing said SRD to a software message bus (SMB), assigning a SAM to each user of said communications network and assigning a SAM to each terminal of said communications network;

(b) creating a temporary software compatibility control (CC) module for each service session initiated by network participants by causing said CC module to handle requests and events according to predetermined processing rules; and, (c) partitioning said CC module into at least two sub-modules, one being a request handling module (RH) for handing requests from network participants; and one being an event handling module (EH) for handling events generated by said RH by causing an event to access a selected SRD via its SAM.

2. The method as defined in claim 1, further comprising the step of storing said predetermined processing rules in a compatibility data base (CDB).

3. The method as defined in claim 2, further comprising the step of retrieving a sub-set of said predetermined processing rules from said CDB everytime a CC module is created in step (b).

4. The method as defined in claim 3, said step (b) being initiated every time an SRD, via its associated SAM, originates an initial event message on said SMB.

5. The method as defined in claim 1, said step (b) being initiated every time an SRD, via its associated SAM, originates an initial event message on said SMB.

* * * * *

UNITED STATES PATENT AND TRADEMARK OFFICE
CERTIFICATE OF CORRECTION

PATENT NO. : 6,080,202
DATED : June 27, 2000
INVENTOR(S) : Strickland et al.

It is certified that error appears in the above-identified patent and that said Letters Patent is hereby corrected as shown below:

Column 14,
Line 1, "handing" should be -- handling --.

Signed and Sealed this

Sixth Day of November, 2001

Attest:

*Attesting Officer*

NICHOLAS P. GODICI
*Acting Director of the United States Patent and Trademark Office*